US011493826B2

(12) United States Patent
O'Brien et al.

(10) Patent No.: US 11,493,826 B2
(45) Date of Patent: Nov. 8, 2022

(54) METHOD AND APPARATUS FOR SHARING POWER BETWEEN INTERNAL AND EXTERNAL POWER SOURCES

(71) Applicant: GoPro, Inc., San Mateo, CA (US)

(72) Inventors: Aaron O'Brien, San Clara, CA (US); Rajesh Madhur, San Jose, CA (US); Sameer Mysore Venugopal, Milpitas, CA (US); Casimir Karczewski, Mountain View, CA (US)

(73) Assignee: GoPro, Inc., San Mateo, CA (US)

( * ) Notice: Subject to any disclaimer, the term of this patent is extended or adjusted under 35 U.S.C. 154(b) by 410 days.

(21) Appl. No.: 16/710,863

(22) Filed: Dec. 11, 2019

(65) Prior Publication Data

US 2021/0181595 A1  Jun. 17, 2021

(51) Int. Cl.
*H02J 7/00* (2006.01)
*G03B 7/26* (2021.01)
*H01M 10/48* (2006.01)
*H01M 10/42* (2006.01)

(52) U.S. Cl.
CPC ............ *G03B 7/26* (2013.01); *H01M 10/425* (2013.01); *H01M 10/482* (2013.01); *H01M 10/486* (2013.01); *G03B 2217/007* (2013.01); *H01M 2010/4271* (2013.01); *H01M 2010/4278* (2013.01)

(58) Field of Classification Search
USPC .................. 320/101, 106, 107, 108, 110, 134
See application file for complete search history.

(56) References Cited

U.S. PATENT DOCUMENTS

| 7,598,702 | B2 * | 10/2009 | Walrath | ................ G06F 1/3203 |
|  |  |  |  | 320/107 |
| 2015/0137598 | A1 * | 5/2015 | Hawawini | .............. G01R 31/00 |
|  |  |  |  | 307/31 |
| 2016/0094084 | A1 * | 3/2016 | Sotani | ............... H01L 31/02021 |
|  |  |  |  | 320/101 |
| 2019/0163250 | A1 * | 5/2019 | Lee | ....................... G06F 1/3206 |

FOREIGN PATENT DOCUMENTS

| CN | 104145398 A | * | 11/2014 | .......... B60L 11/1864 |
| JP | 2015537500 A | * | 10/2013 | |
| KR | 20120079674 A | * | 12/2007 | |
| KR | 20160033588 A | * | 3/2016 | |

\* cited by examiner

*Primary Examiner* — Brian Ngo
(74) *Attorney, Agent, or Firm* — Young Basile Hanlon & MacFarlane, P.C.

(57) ABSTRACT

Devices and methods for sharing power between power sources are disclosed. The power sources may be internal to an electronic device, external to the electronic device, or both. An electronic device may include a power source, a switch circuit, a processor, and a power management integrated circuit (PMIC). The processor may determine a load current estimate. The load current estimate may be based on a device setting, an external temperature, or both. The processor may determine a power source voltage, an external power source voltage, or both. The processor may determine a power source current, an external power source current, or both. The PMIC may set an output power source current of the power source. The PMIC may set an output external power source current of the external power source.

20 Claims, 11 Drawing Sheets

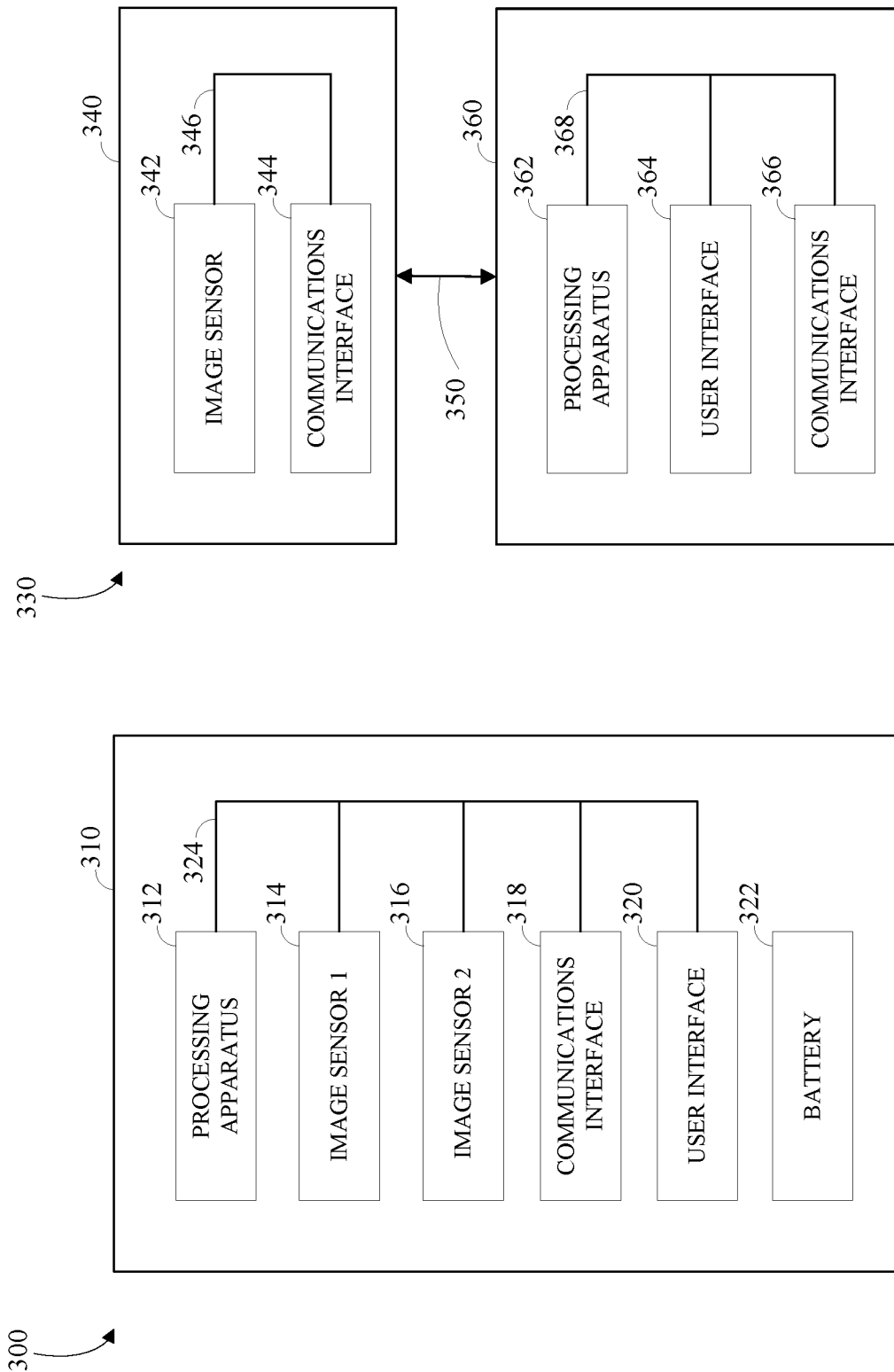

METHOD AND APPARATUS FOR SHARING POWER BETWEEN INTERNAL AND EXTERNAL POWER SOURCES

TECHNICAL FIELD

This disclosure relates to intelligent power sharing between two or more power sources.

BACKGROUND

At low temperatures, the discharge current capability of lithium ion (Li-ion) batteries is significantly reduced resulting in reduced battery run times. External batteries have been used to increase battery run times for devices operating at low temperatures, however, the external battery also experiences a significantly reduced discharge current capability at low temperatures. Accordingly, systems and methods are needed to improve battery performance at low temperatures.

SUMMARY

Disclosed herein are implementations of devices and methods for sharing power between power sources. The power sources may be internal to an electronic device, external to the electronic device, or both. In some implementations, the electronic device may be an image capture device. In an aspect, an image capture device may include a power source, a switch circuit, a processor, and a power management integrated circuit (PMIC). The switch circuit may be coupled to the power source, an external power source, or both. The processor may be coupled to the switch circuit, the power source, the external power source, or any combination thereof. The processor may be configured to determine a load current estimate. The load current estimate may be based on a device setting, an external temperature, or both. The processor may be configured to determine a power source voltage, an external power source voltage, or both. The processor may be configured to determine a power source current, an external power source current, or both. The power source current, the external power source current, or both, may be based on the load current estimate. The PMIC may be coupled to the processor. The PMIC may be configured to set an output power source current of the power source. The output power source current may be based on the determined power source current. The PMIC may be configured to set an output external power source current of the external power source. The output external power source current may be based on the determined external power source current.

In an aspect, an image capture device may include a first power source, a second power source, a switch circuit, a processor, a PMIC, or any combination thereof. The switch circuit may be coupled to the first power source, the second power source, or both. The processor may be coupled to the switch circuit, the first power source, the second power source, or any combination thereof. The processor may be configured to obtain first power source data from the first power source. The processor may be configured to obtain second power source data from the second power source. The processor may be configured to determine a load current estimate. The load current estimate may be based on a device setting, an external temperature, or both. The processor may be configured to determine a first power source voltage, a second power source voltage, or both. The processor may be configured to determine a first power source current, a second power source current, or both. The first power source current may be based on the load current estimate. The second power source current may be based on the load current estimate. The PMIC may be coupled to the processor. The PMIC may be configured to set an output power source current of the first power source. The output power source current of the first power source may be based on the determined first power source current. The PMIC may be configured to set an output power source current of the second power source. The output power source current of the second power source may be based on the determined second power source current.

In an aspect, a method may include obtaining first power source data from a first power source. The method may include obtaining second power source data from a second power source. The method may include determining a load current estimate based on a device setting, an external temperature, or both. The method may include determining a first power source voltage. The method may include determining a second power source voltage. The method may include determining a first power source current. The first power source current may be based on the load current estimate. The method may include determining a second power source current. The second power source current may be based on the load current estimate.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A-B are block diagrams of examples of image capture systems.

DETAILED DESCRIPTION

Figure 1A:
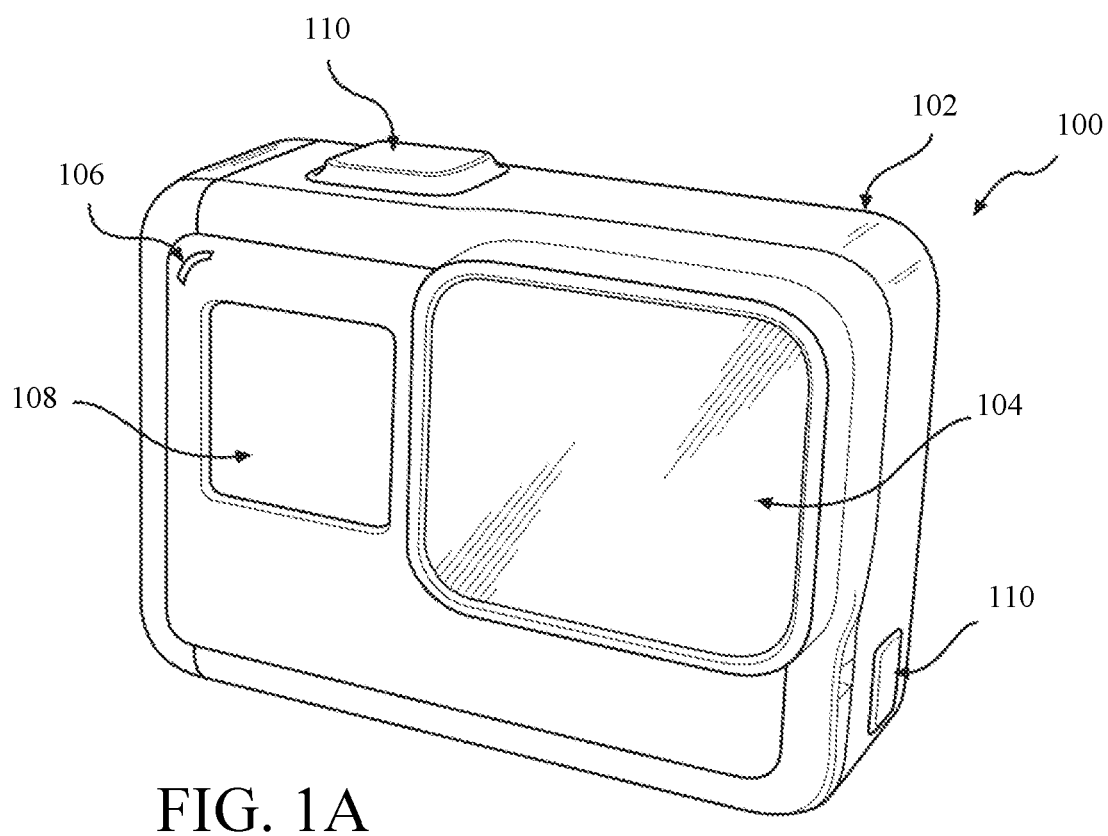
FIGS. 1A-D are isometric views of an example of an image capture device.

The systems and methods disclosed herein may implement multiple power sources in parallel and intelligently distribute the current requirements between the power sources. Embodiments disclosed herein may supply each power source with a fraction of the total load. As the load current on a power source is decreased, the low temperature performance of the power source improves.

In an example, a typical power source at 23° C. may support a full load for a device for approximately 2500 seconds. The same power source at −10° C. may be completely inoperable at this low temperature and not support a full load for a device for any amount of time. In one or more embodiments, any number of multiple power sources may be used in parallel. The current requirements between the power sources may be intelligently distributed in accordance with one or more embodiments disclosed herein. For example, two power sources at −10° C. may each supply approximately a half-load, and be used to support a full load for approximately 2300 seconds.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
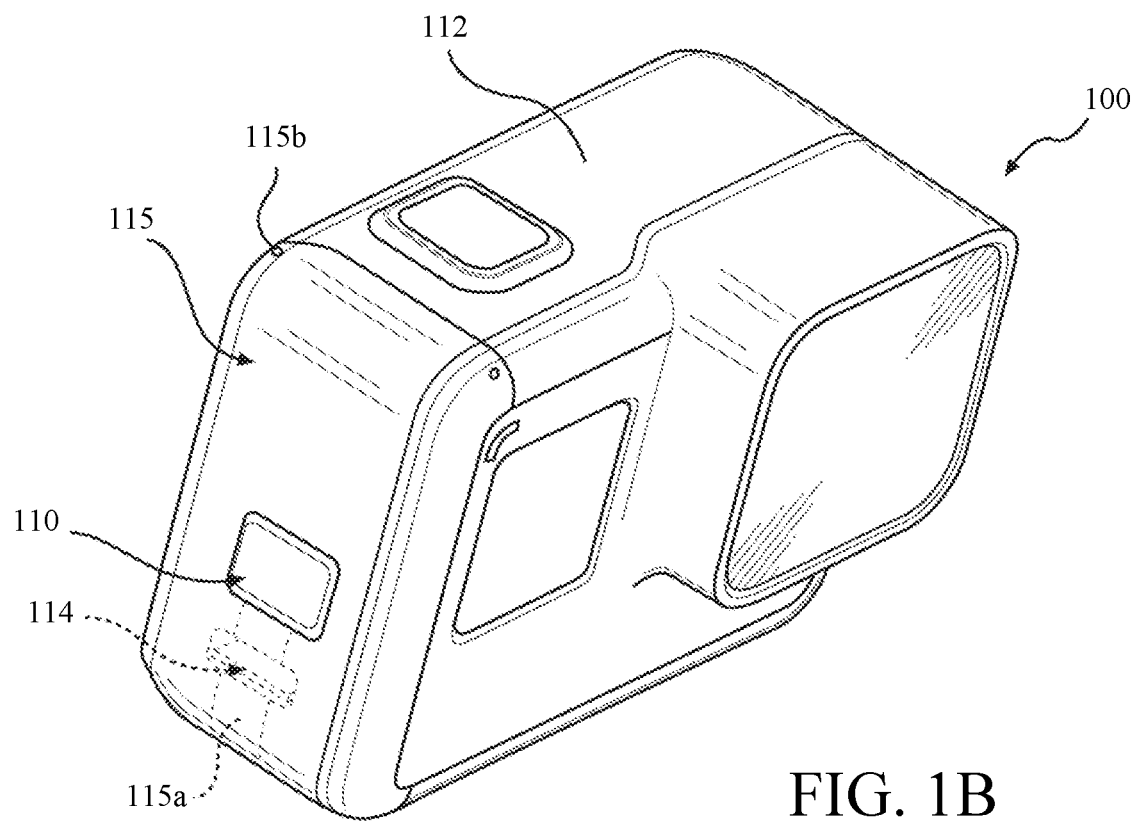
Figure 1C:
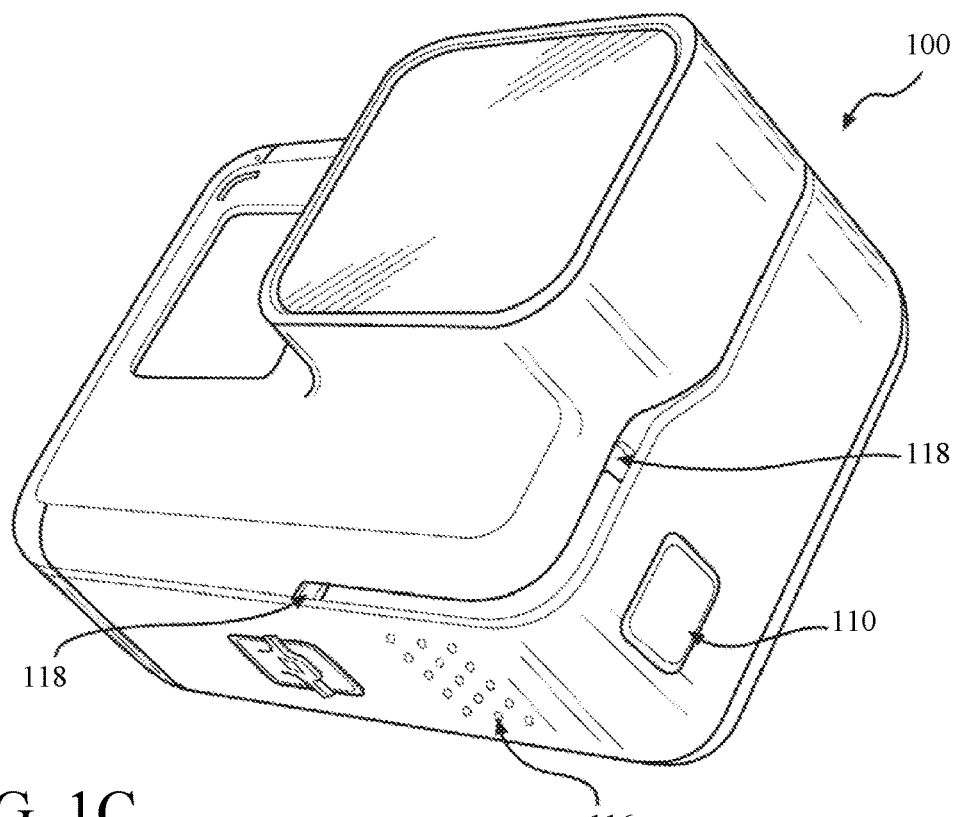
Figure 1D:
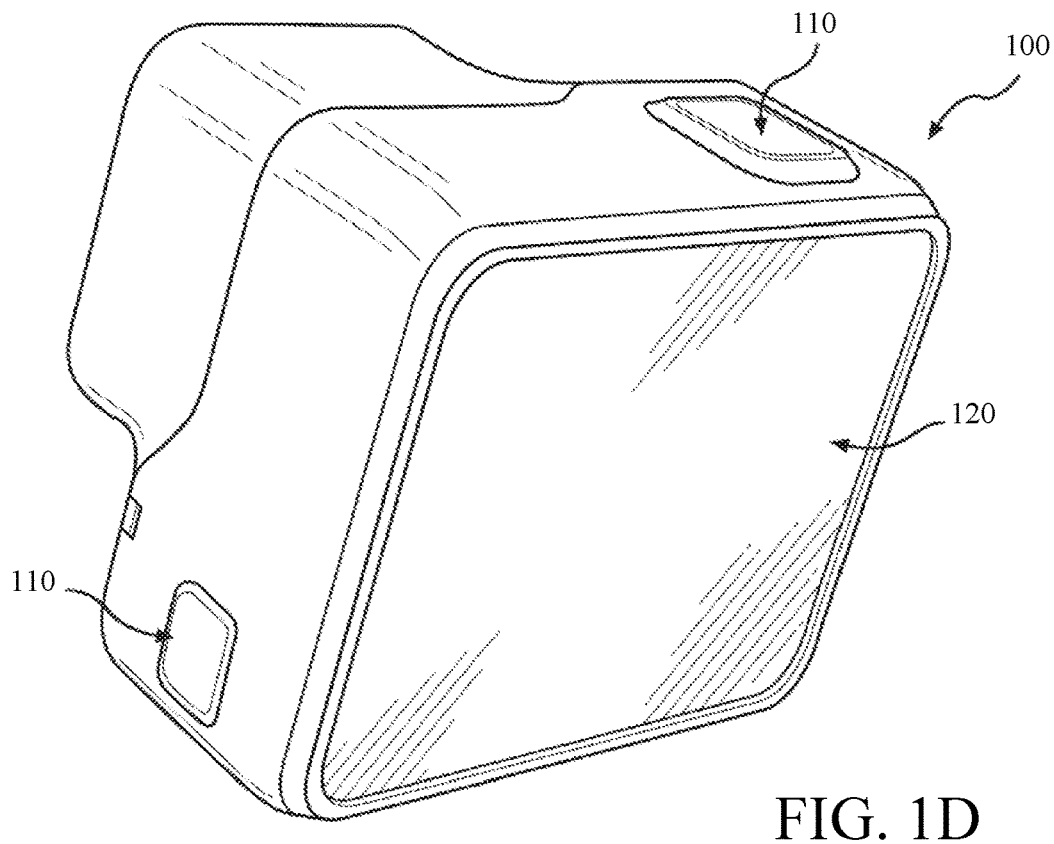

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include a speaker 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
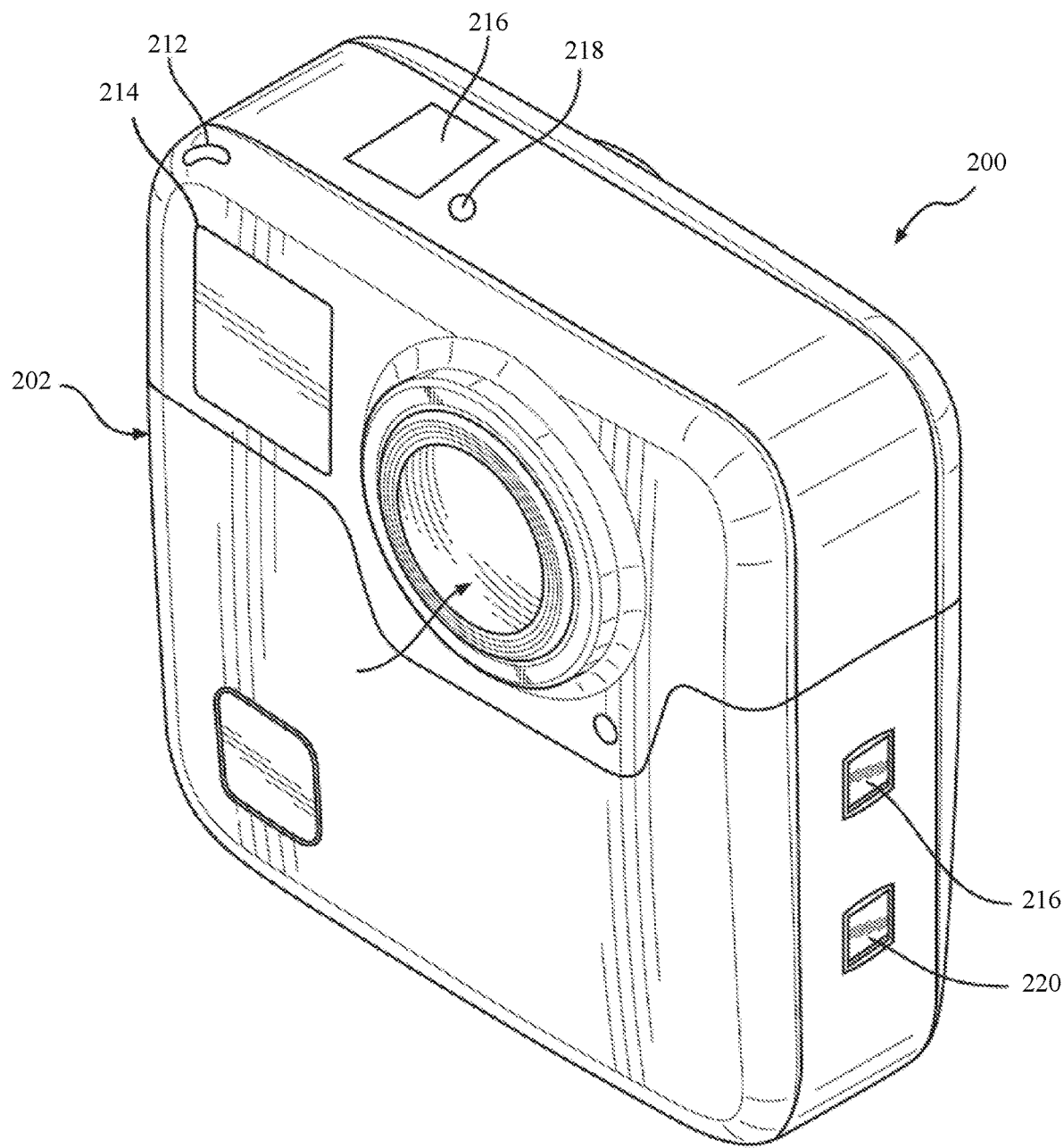
FIGS. 2A-B are isometric views of another example of an image capture device.
Figure 2B:
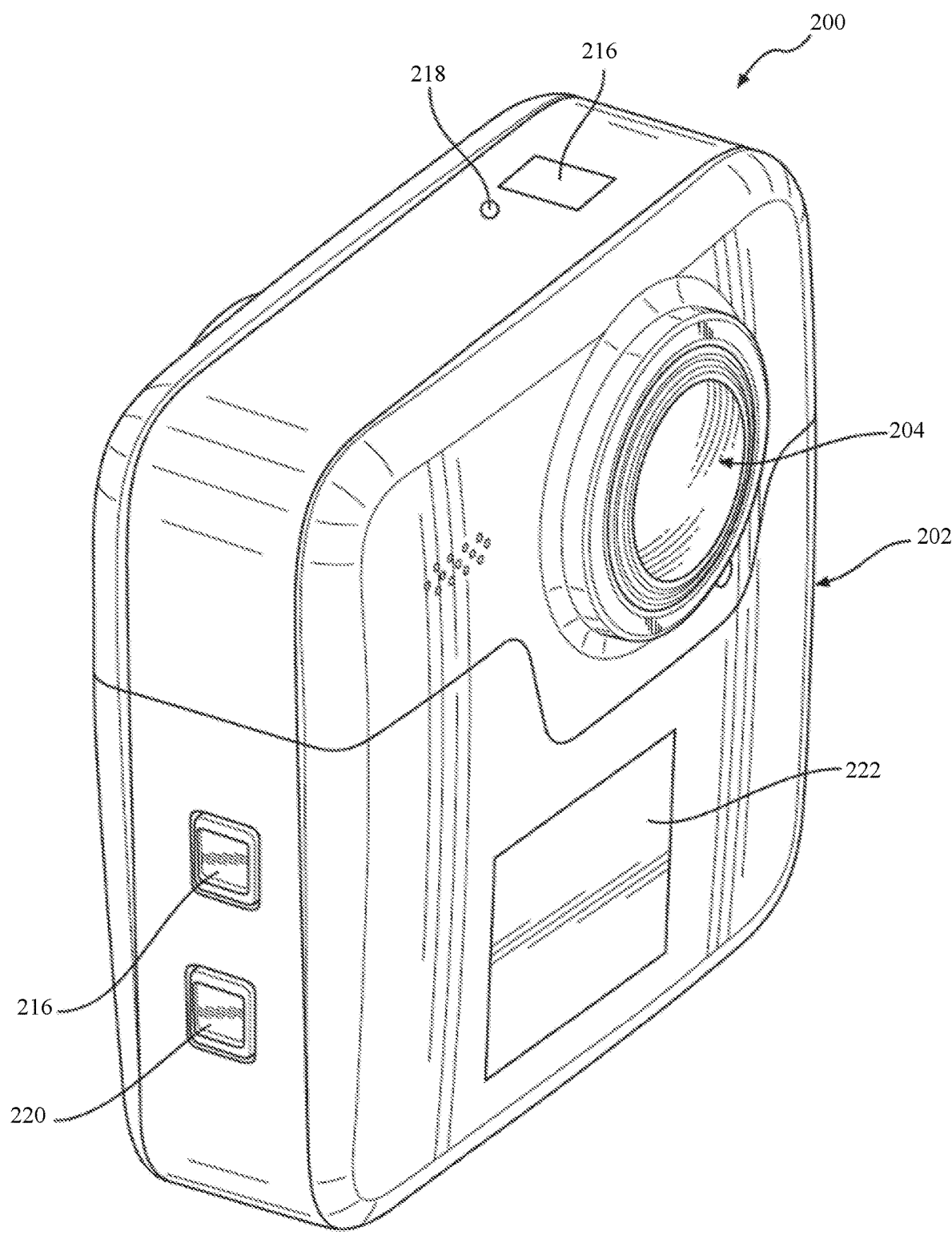

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
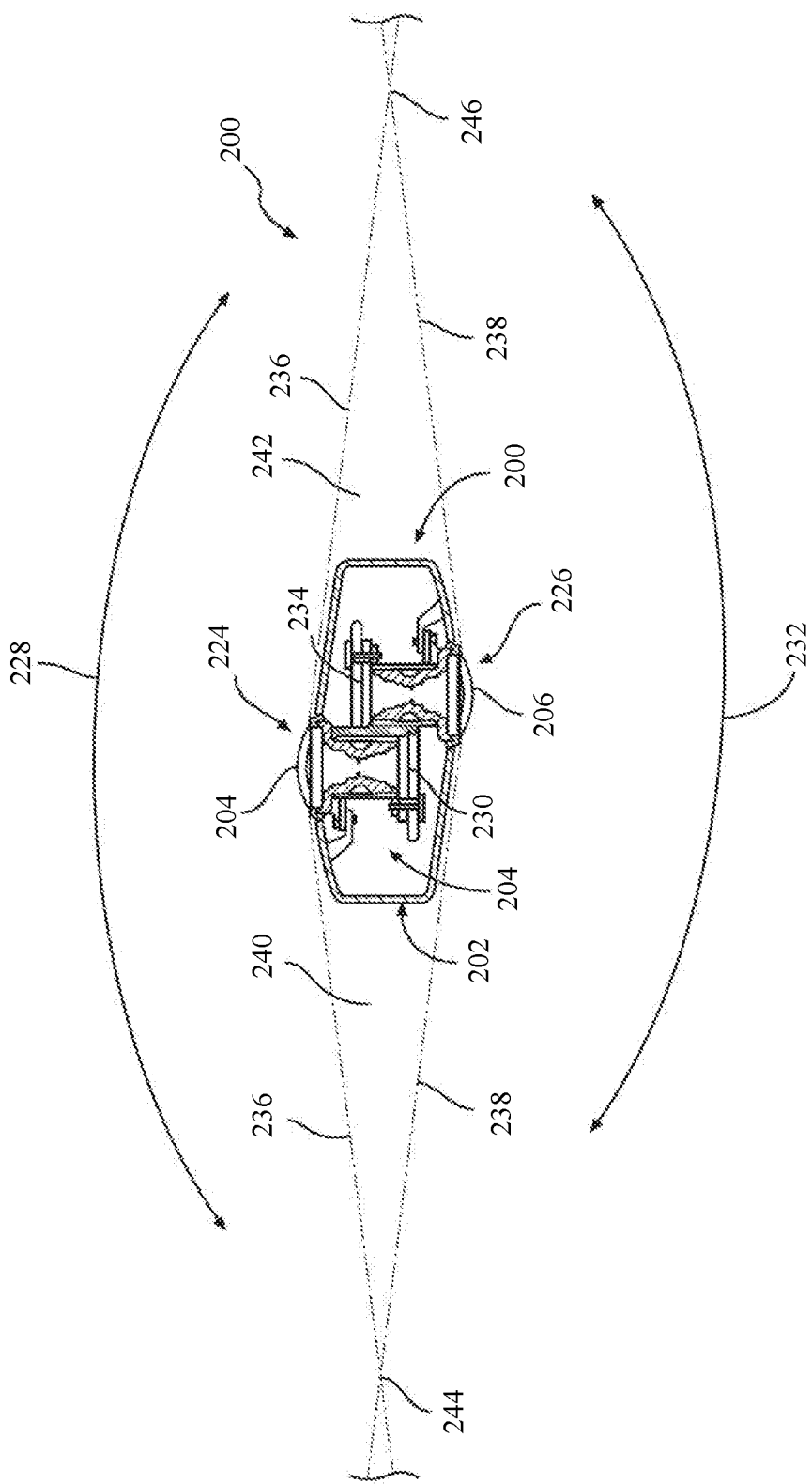
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a power source, such as battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. The communications interface 318 may be used to connect an external power source, for example, and external battery, to the image capture device 310. Examples of the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface. Although not shown in FIG. 3A, the image capture device 310 may be configured with more than one communications interface 318.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Figure 8:
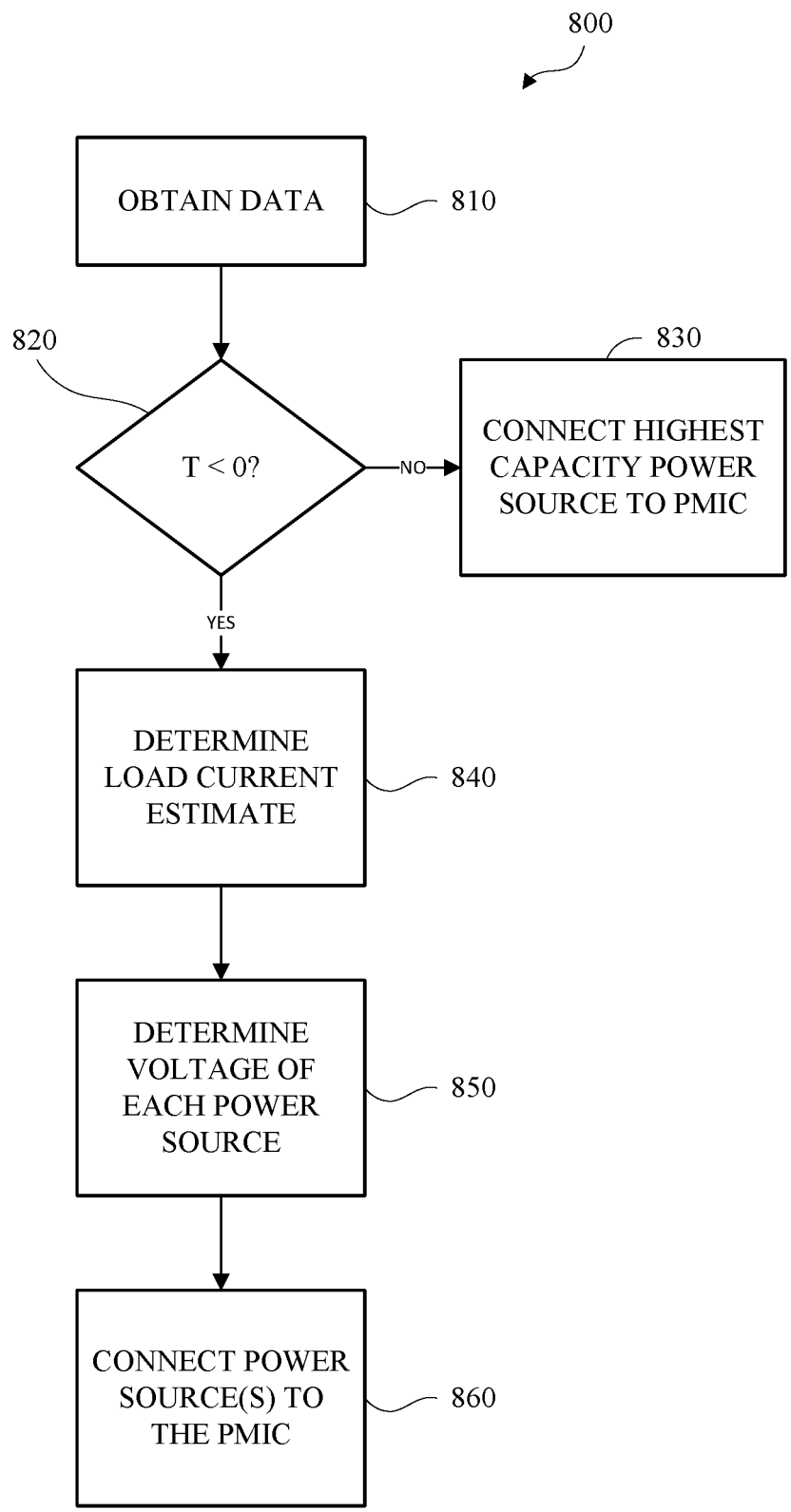
FIG. 8 is a flow diagram of an example method of power sharing between multiple power sources in accordance with an embodiment of this disclosure.

The image capture system 300 may be used to implement some or all of the techniques described in this disclosure, such as the technique 800 described in FIG. 8.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or capture photo) received via the user interface 364 may be passed on to the image capture device 340 via the communications link 350.

The image capture system 330 may be used to implement some or all of the techniques described in this disclosure, such as the technique 800 of FIG. 8.

Figure 4:
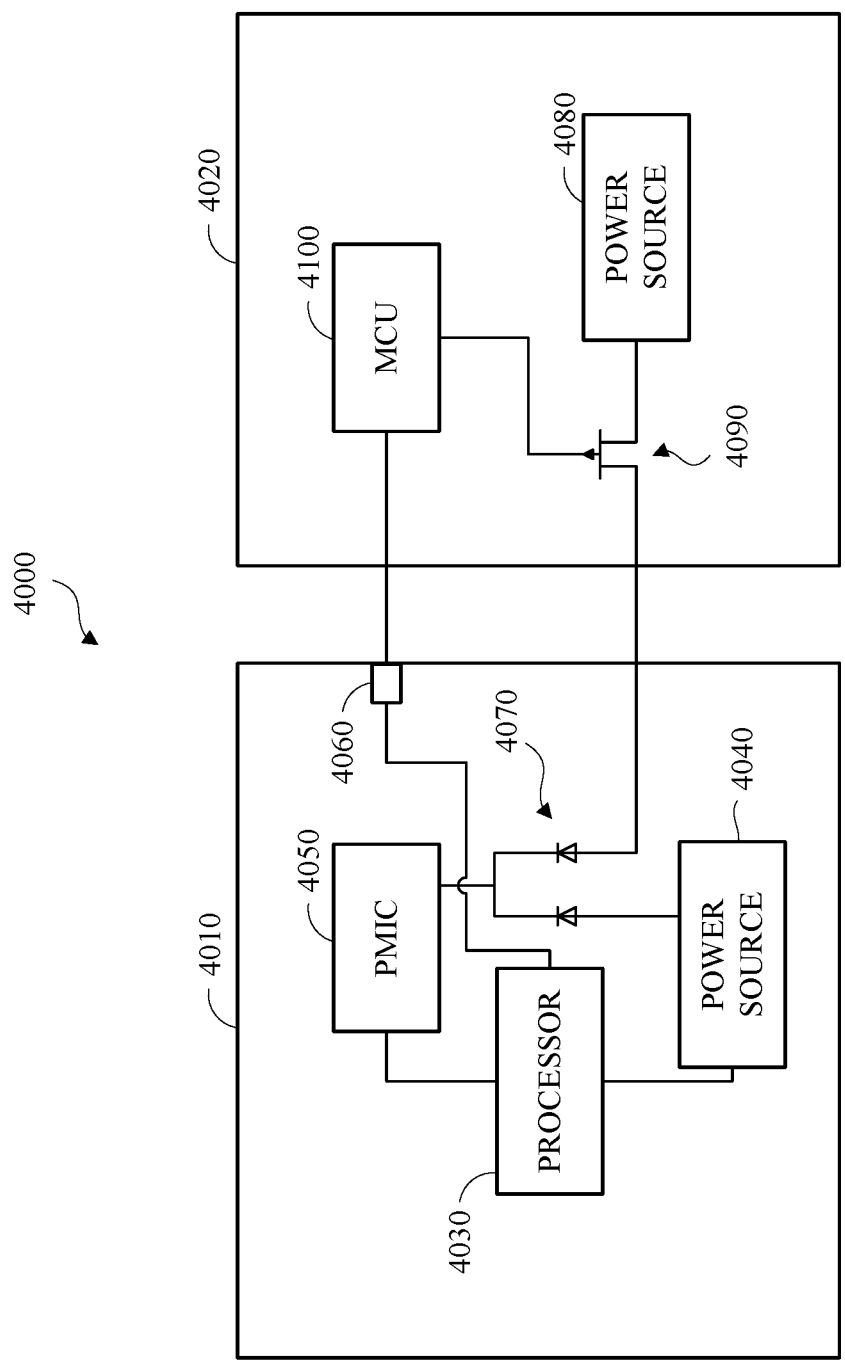
FIG. 4 is a block diagram of an example of an image capture system in accordance with an embodiment of this disclosure.

FIG. 4 is a block diagram of an example of an image capture system 4000 in accordance with an embodiment of this disclosure. As shown in FIG. 4, the image capture system 4000 includes an image capture device 4010 and a secondary power device 4020. In this example, the secondary power device 4020 is shown as an external power device. Some implementations may include one or more secondary power devices, such as secondary power device 4020, in the image capture device 4010. The image capture device 4010 may, for example, be the image capture device 100 shown in FIGS. 1A-D or the image capture device 200 shown in FIGS. 2A-C.

Referring to FIG. 4, the image capture device 4010 includes a processor 4030, a power source 4040, and a power management integrated circuit (PMIC) 4050. As shown in FIG. 4, the processor 4030 is coupled to the power source 4040 and the PMIC 4050. Although the image capture device 4010 is shown with one power source, some implementations of image capture device 4010 may include multiple power sources. The power source 4040 may be a battery that includes one or more electrochemical cells, including lithium ion (Li-ion) cells, nickel cadmium (NiCd) cells, nickel metal hydride (NiMH) cells, or any other suitable cells. The power source 4040 may include a sensor (not shown), for example a temperature sensor configured to determine the temperature of the power source 4040.

The processor 4030 may be configured to obtain data from the power source 4040. The data obtained from the power source 4040 may include power source temperature, power source state of charge, power source age, power source capacity, power source cycle count, power source state of health, or any combination thereof.

The PMIC 4050 is a solid state device that controls the flow and direction of electrical power. The PMIC 4050 may be configured to manage battery charging, power source selection, voltage scaling, power sequencing, or any combination thereof. In this example, the PMIC 4050 is coupled to a pair of diodes 4070. The number of diodes may increase respectively as the number of power sources increase. The pair of diodes 4070 are respectively coupled to the power source 4040 of the image capture device 4010 and a power source 4080 of the secondary power device 4020. The power source 4080 may include a sensor (not shown), for example a temperature sensor configured to determine the temperature of the power source 4080. The power source 4080 may be coupled to the respective diode of the pair of diodes 4070 via a field effect transistor (FET) 4090. The FET 4090 may be a p-channel FET or an m-channel FET. The PMIC 4050 is configured to regulate the voltage from the power source 4040 and the power source 4080.

The image capture device 4010 includes an interface 4060 that may be used to connect an external power device, for example, secondary power device 4020. Examples of the interface 4060 may include a wired interface, such as an HDMI, a USB interface, or a FireWire interface. For example, the interface 4060 may include a wireless interface, such as an inductive charging interface, a Bluetooth interface, a ZigBee interface, and/or a Wi-Fi interface. In an inductive charging interface example, the interface 4060 may be an inductive coupling configured to transfer energy from the secondary power device 4020 to the image capture device 4010.

The secondary power device 4020 includes a microcontroller unit (MCU) 4100. The MCU 4100 is coupled to the power source 4080 via the FET 4090. The MCU 4100 may be coupled to the interface 4060 of the image capture device 4010 via a serial bus such as, for example, an I2C bus. The MCU 4100 may be configured to obtain data from the power source 4080. The data obtained from the power source 4080 may include power source temperature, power source state of charge, power source age, power source capacity, power source cycle count, power source state of health, or any combination thereof.

The processor 4030 is configured to obtain data from the power source 4040 and the MCU 4100. The data obtained by the processor 4030 may include power source temperature, power source state of charge, power source age, power source capacity, power source cycle count, power source state of health, or any combination thereof, of power source 4040 and power source 4080. The processor 4030 may be configured to determine a load current estimate. The load current estimate is an estimate of the current required to perform a desired function. The current load estimate may be based on a device setting, an external temperature, data obtained from the power source 4040, data obtained from the power source 4080, data obtained from the MCU 4100, or any combination thereof. The load current estimate may be determined using a mapping table. A device setting may include an image or video resolution, a framerate, a file type, a power setting, an audio setting, a display setting, or any other configurable device setting. The processor 4030 may be configured to determine a voltage of power source 4040 and a voltage of power source 4080. The processor 4030 may be configured to determine a current for the power source 4040 and a current for the power source 4080. The respective currents for power source 4040 and power source 4080 may be based on the load current estimate.

The PMIC 4050 is configured to obtain the determined current for the power source 4040 and the determined current for the power source 4080. The PMIC 4050 is configured to control the current of each power source via the pair of diodes 4070. The PMIC 4050 may be configured to set an output current of the power source 4040 based on the respective determined power source current. The PMIC 4050 may be configured to set an output current of the second power source 4080 based on the respective determined power source current. The processor 4030 may be configured to continuously monitor power source 4040 and power source 4080 to dynamically adjust the load current estimate based on changing conditions to increase image capture device 4010 run times. The PMIC 4050 may be configured to dynamically control the pair of diodes 4070 to adjust the respective currents of power source 4040 and power source 4080 based on changing conditions.

Figure 5:
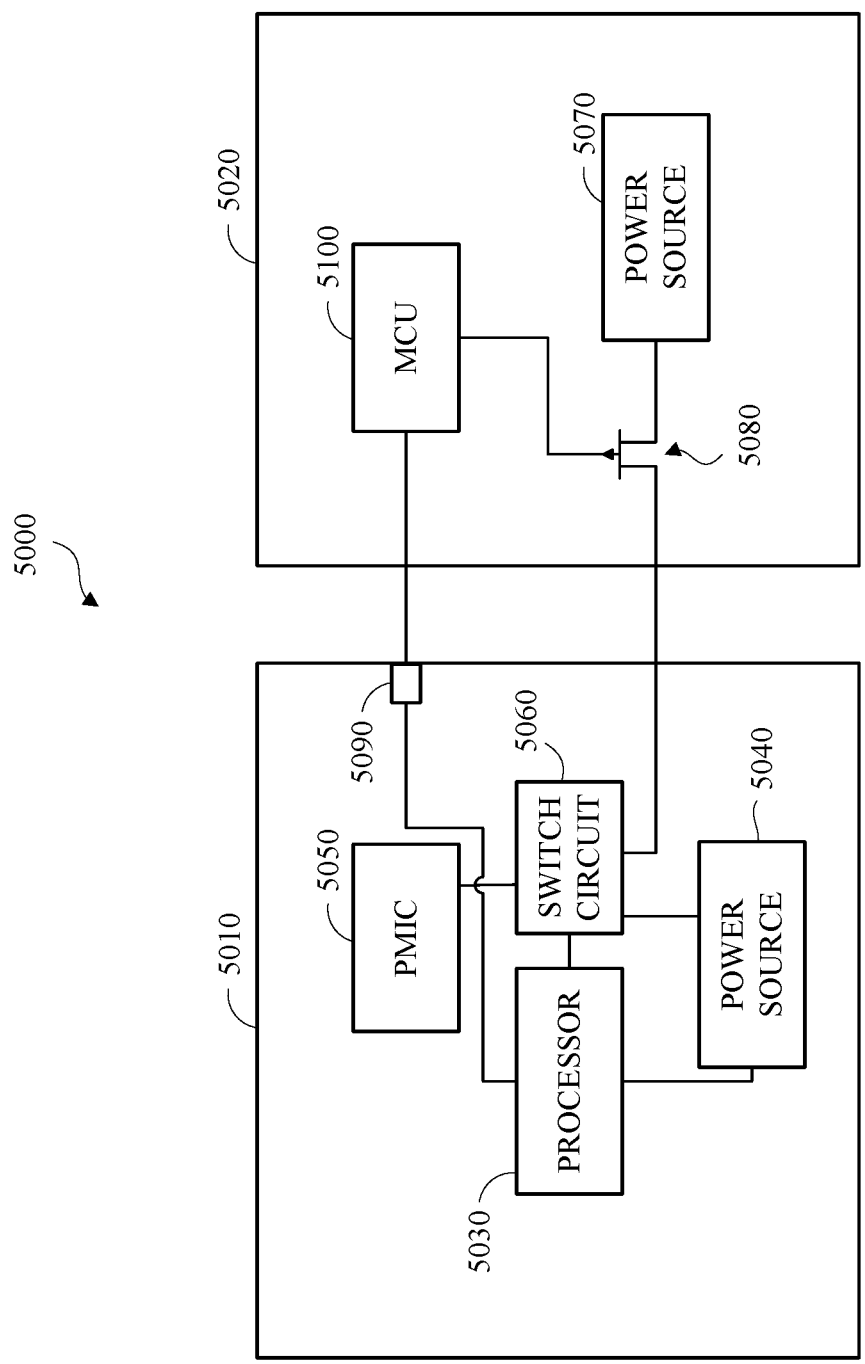
FIG. 5 is a block diagram of another example of an image capture system in accordance with an embodiment of this disclosure.

FIG. 5 is a block diagram of another example of an image capture system 5000 in accordance with an embodiment of this disclosure. As shown in FIG. 5, the image capture system 5000 includes an image capture device 5010 and a secondary power device 5020. In this example, the secondary power device 5020 is shown as an external power device. Some implementations may include one or more secondary power devices, such as secondary power device 5020, in the image capture device 5010. The image capture device 5010 may, for example, be the image capture device 100 shown in FIGS. 1A-D or the image capture device 200 shown in FIGS. 2A-C.

Referring to FIG. 5, the image capture device 5010 includes a processor 5030, a power source 5040, and a PMIC 5050. As shown in FIG. 5, the processor 5030 is coupled to the power source 5040 and a switch circuit 5060. Although the image capture device 5010 is shown with one power source, some implementations of image capture device 5010 may include multiple power sources. The power source 5040 may be a battery that includes one or more electrochemical cells, including Li-ion cells, NiCd cells, NiMH cells, or any other suitable cells. The power source 5040 may include a sensor (not shown), for example a temperature sensor configured to determine the temperature of the power source 5040.

The processor 5030 may be configured to obtain data from the power source 5040. The data obtained from the power source 5040 may include power source temperature, power source state of charge, power source age, power source capacity, power source cycle count, power source state of health, or any combination thereof.

The PMIC 5050 is a solid state device that controls the flow and direction of electrical power. The PMIC 5050 may be configured to manage battery charging, power source selection, voltage scaling, power sequencing, or any combination thereof. In this example, the PMIC 5050 is coupled to the switch circuit 5060. The number of switches of the switch circuit 5060 may increase respectively as the number of power sources increase. The switch circuit 5060 is coupled to the power source 5040 of the image capture device 5010 and a power source 5070 of the secondary power device 5020. The power source 5070 may include a sensor (not shown), for example a temperature sensor configured to determine the temperature of the power source 5070. The power source 5070 may be coupled to the switch circuit 5060 via a FET 5080. The FET 5080 may be a p-channel FET or an m-channel FET. The PMIC 5050 is configured to regulate the voltage from the power source 5040 and the power source 5070.

The image capture device 5010 includes an interface 5090 that may be used to connect an external power device, for example, secondary power device 5020. Examples of the interface 5090 may include a wired interface, such as an HDMI, a USB interface, or a FireWire interface. For example, the interface 5090 may include a wireless interface, such as an inductive charging interface, a Bluetooth interface, a ZigBee interface, and/or a Wi-Fi interface. In an inductive charging interface example, the interface 5090 may be an inductive coupling configured to transfer energy from the secondary power device 5020 to the image capture device 5010.

The secondary power device 5020 includes an MCU 5100. The MCU 5100 is coupled to the power source 5070 via the FET 5080. The MCU 5100 may be coupled to the interface 5090 of the image capture device 5010 via a serial bus such as, for example, an I2C bus. The MCU 5100 may be configured to obtain data from the power source 5070. The data obtained from the power source 5070 may include power source temperature, power source state of charge, power source age, power source capacity, power source cycle count, power source state of health, or any combination thereof.

The processor 5030 is configured to obtain data from the power source 5040 and the MCU 5100. The data obtained by the processor 5030 may include power source temperature, power source state of charge, power source age, power source capacity, power source cycle count, power source state of health, or any combination thereof, of power source 5040 and power source 5070. The processor 5030 may be configured to determine a load current estimate. The load current estimate is an estimate of the current required to perform a desired function. The current load estimate may be based on a device setting, an external temperature, data obtained from the power source 5040, data obtained from the power source 5070, data obtained from the MCU 5100, or any combination thereof. The load current estimate may be determined using a mapping table. A device setting may include an image or video resolution, a framerate, a file type, a power setting, an audio setting, a display setting, or any other configurable device setting. The processor 5030 may be configured to determine a voltage of power source 5040 and a voltage of power source 5070. The processor 5030 may be configured to determine a current for the power source 5040 and a current for the power source 5070. The respective currents for power source 5040 and power source 5070 may be based on the load current estimate.

The PMIC 5050 is configured to obtain the determined current for the power source 5040 and the determined current for the power source 5070. The PMIC 5050 is configured to control the current of each power source via the switch circuit 5060. The PMIC 5050 may be configured to control the switch circuit 5060 to connect power source 5040, power source 5070, or both to the PMIC based on the determined current for each power source. The PMIC 5050 may be configured to set an output current of the power source 5040 based on the respective determined power source current. The PMIC 5050 may be configured to set an output current of the second power source 5070 based on the respective determined power source current. The processor 5030 may be configured to continuously monitor power source 5040 and power source 5070 to dynamically adjust the load current estimate based on changing conditions to increase image capture device 5010 run times. The PMIC 5050 may be configured to dynamically control the switch circuit 5060 to adjust the respective currents of power source 5040 and power source 5070 based on changing conditions.

Figure 6:
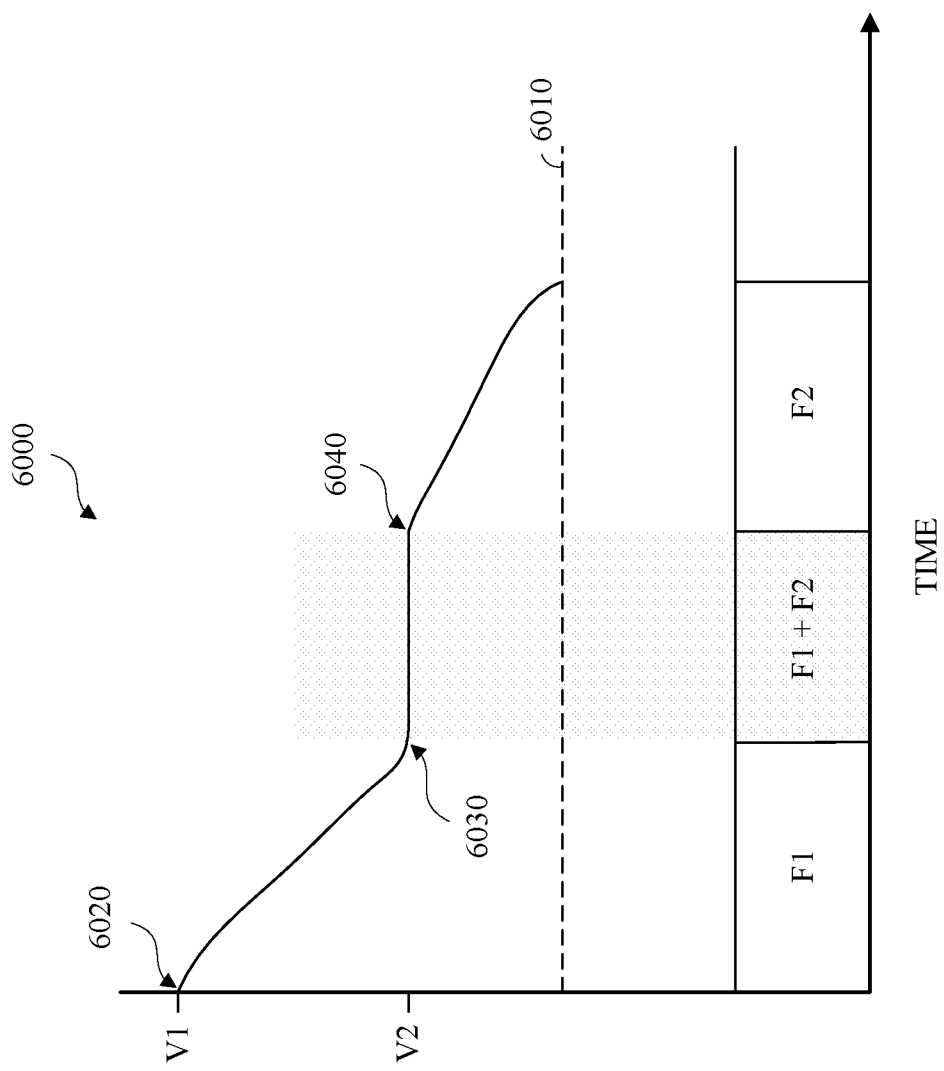
FIG. 6 is a graphical depiction of power sharing between two power sources in accordance with an embodiment of this disclosure.

FIG. 6 is a graphical depiction 6000 of power sharing between two power sources in accordance with an embodiment of this disclosure, where a first power source has a first initial voltage (V1) and a second power source has a second initial voltage (V2). The difference in voltage between V1 and V2 may range from approximately 100-200 mV. For example, V1 may be 4.0 V and V2 may be 3.8 V. The dashed line 6010 is the minimum voltage required before the electronic device powers down. As shown in FIG. 6, an electronic device may begin drawing power from the first power source at point 6020 by initiating a FET (F1) that controls the first power source. As the electronic device consumes power from the first power source, the voltage of the first power source decreases until the voltage approximately reaches the voltage V2 of the second power source. At this point 6030, the second FET (F2) that controls the second power source may be initiated. As shown in FIG. 6, the voltage levels off when the second power source is initiated. The shaded area of the graph shows a steady voltage where the electronic device is drawing power from both power sources simultaneously. At point 6040, the first power source is switched off and the electronic device continues to draw power from only the second power source.

Figure 7:
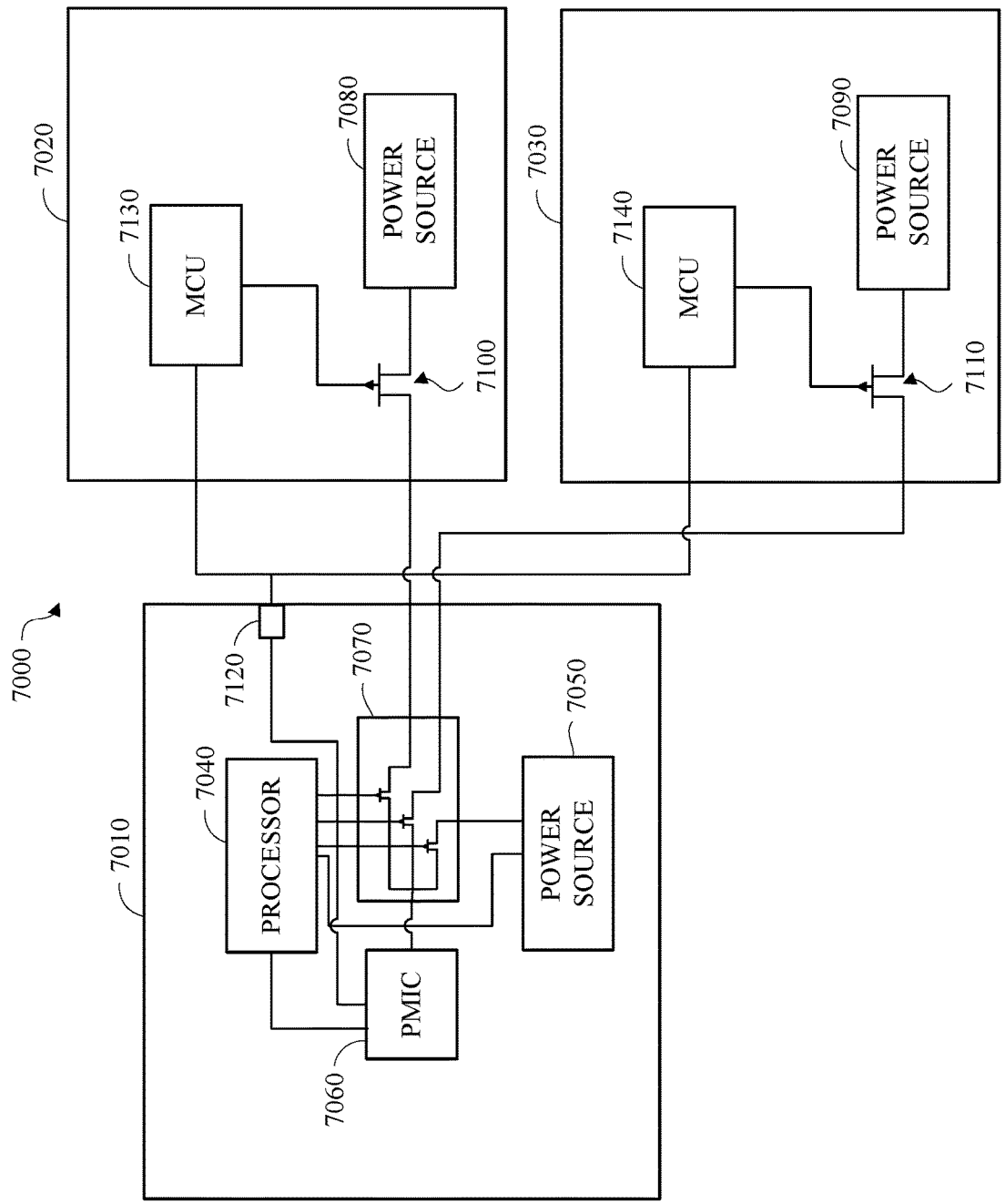
FIG. 7 is a block diagram of another example of an image capture system in accordance with an embodiment of this disclosure.

FIG. 7 is a block diagram of another example of an image capture system 7000 in accordance with an embodiment of this disclosure. As shown in FIG. 7, the image capture system 7000 includes an image capture device 7010, a secondary power device 7020, and a secondary power device 7030. In this example, the secondary power device 7020 and the secondary power device 7030 are shown as an external power devices. Some implementations may include one or more secondary power devices, such as secondary power device 7020, in the image capture device 7010. The image capture device 7010 may, for example, be the image capture device 100 shown in FIGS. 1A-D or the image capture device 200 shown in FIGS. 2A-C.

Referring to FIG. 7, the image capture device 7010 includes a processor 7040, a power source 7050, and a PMIC 7060. As shown in FIG. 7, the processor 7040 is coupled to the power source 7050 and a switch circuit 7070. Although the image capture device 7010 is shown with one power source, some implementations of image capture device 7010 may include multiple power sources. The power source 7050 may be a battery that includes one or more electrochemical cells, including Li-ion cells, NiCd cells, NiMH cells, or any other suitable cells. The power source 7050 may include a sensor (not shown), for example a temperature sensor configured to determine the temperature of the power source 7050.

The processor 7040 may be configured to obtain data from the power source 7050. The data obtained from the power source 7050 may include power source temperature, power source state of charge, power source age, power source capacity, power source cycle count, power source state of health, or any combination thereof.

The PMIC 7060 is a solid state device that controls the flow and direction of electrical power. The PMIC 7060 may be configured to manage battery charging, power source selection, voltage scaling, power sequencing, or any combination thereof. In this example, the PMIC 7060 is coupled to the switch circuit 7070. The number of switches of the switch circuit 7070 may increase respectively as the number of power sources increase. In this example, each switch of the switch circuit 7070 may be a FET. Each FET of the switch circuit 7070 may be an on-off FET or a variable control FET. The switch circuit 7070 is coupled to the power source 7050 of the image capture device 7010, a power source 7080 of the secondary power device 7020, and a power source 7090 of the secondary power source 7030. The power source 7080 and the power source 7090 may each include a sensor (not shown), for example a temperature sensor configured to determine the respective temperatures of power source 7080 and power source 7090. The power source 7080 may be coupled to the switch circuit 7070 via a FET 7100. The FET 7100 may be a p-channel FET or an m-channel FET. The power source 7090 may be coupled to the switch circuit 7070 via a FET 7110. The FET 7110 may be a p-channel FET or an m-channel FET. The PMIC 7060 is configured to regulate the voltage from the power source 7050, the power source 7080, and the power source 7090.

The image capture device 7010 includes an interface 7120 that may be used to connect one or more external power devices, for example, secondary power device 7020 and secondary power device 7030. Examples of the interface 7120 may include a wired interface, such as an HDMI, a USB interface, or a FireWire interface. For example, the interface 7120 may include a wireless interface, such as an inductive charging interface, a Bluetooth interface, a ZigBee interface, and/or a Wi-Fi interface. In an inductive charging interface example, the interface 7120 may be an inductive coupling configured to transfer energy from the secondary power device 7020 and the secondary power device 7030 to the image capture device 7010.

The secondary power device 7020 includes an MCU 7130. The MCU 7130 is coupled to the power source 7080 via the FET 7100. The MCU 7130 may be coupled to the interface 7120 of the image capture device 7010 via a serial bus such as, for example, an I2C bus. The MCU 7130 may be configured to obtain data from the power source 7080. The data obtained from the power source 7080 may include power source temperature, power source state of charge, power source age, power source capacity, power source cycle count, power source state of health, or any combination thereof.

The secondary power device 7030 includes an MCU 7140. The MCU 7140 is coupled to the power source 7090 via the FET 7110. The MCU 7140 may be coupled to the interface 7120 of the image capture device 7010 via a serial bus such as, for example, an I2C bus. The MCU 7140 may be configured to obtain data from the power source 7090. The data obtained from the power source 7090 may include power source temperature, power source state of charge, power source age, power source capacity, power source cycle count, power source state of health, or any combination thereof.

The processor 7040 is configured to obtain data from the power source 7050, the MCU 7130, and the MCU 7140. The data obtained from the MCU 7130 and the MCU 7140 may be obtained via the PMIC 7060. The data obtained by the processor 7030 may include power source temperature, power source state of charge, power source age, power source capacity, power source cycle count, power source state of health, or any combination thereof, of power source 7050, power source 7080, and power source 7090. The processor 7030 may be configured to determine a load current estimate. The load current estimate is an estimate of the current required to perform a desired function. The current load estimate may be based on a device setting, an external temperature, data obtained from the power source 7050, data obtained from the power source 7080, data obtained from the MCU 7130, data obtained from the power source 7090, data obtained from MCU 7140, or any combination thereof. The load current estimate may be determined using a mapping table. A device setting may include an image or video resolution, a framerate, a file type, a power setting, an audio setting, a display setting, or any other configurable device setting. The processor 7040 may be configured to determine a voltage of power source 7050, a voltage of power source 7080, and a voltage of power source 7090. The processor 7040 may be configured to determine a current for the power source 7050, a current for the power source 7080, and a current for the power source 7090. The respective currents for power source 7050, power source 7080, and power source 7090 may be based on the load current estimate.

The PMIC 7060 is configured to obtain the determined current for the power source 7050, the determined current for the power source 7080, and the determined current for the power source 7090. The PMIC 7060 is configured to control the current of each power source via the switch circuit 7070. The PMIC 7060 may be configured to control the switch circuit 7070 to connect power source 7050, power source 7080, power source 7090, or any combination thereof, to the PMIC based on the determined current for each power source. The PMIC 7060 may be configured to set an output current of the power source 7050 based on the respective determined power source current. The PMIC 7050 may be configured to set an output current of the power source 7080 based on the respective determined power source current. The PMIC 7050 may be configured to set an output current of the power source 7090 based on the respective determined power source current. The processor 7030 may be configured to continuously monitor power source 7050, power source 7080, and power source 7090 to dynamically adjust the load current estimate based on changing conditions to increase image capture device 7010 run times. The PMIC 7060 may be configured to dynamically control the switch circuit 7070 to adjust the respective currents of power source 7050, power source 7080, and power source 7090 based on changing conditions.

FIG. 8 is a flow diagram of an example method 800 of power sharing between multiple power sources in accordance with an embodiment of this disclosure. The method 800 includes obtaining 810 data. The data may be obtained by a processor such as processor 5030. The data may be obtained from a power source such as power source 5040, an MCU such as MCU 5100, or both. The data obtained may include power source temperature, power source state of charge, power source age, power source capacity, power source cycle count, power source state of health, or any combination thereof, of one or more power sources. The method 800 includes determining 820 whether an external temperature is less than 0° C. If the temperature is greater than 0° C., the method 800 includes connecting 830 the highest capacity power source available to the PMIC. If the temperature is less than 0° C., the method includes determining 840 a load current estimate. The load current estimate is an estimate of the current required to perform a desired function. The load current estimate may be based on a device setting, an external temperature, data obtained from the power source 5040, data obtained from one or more power sources, data obtained from one or more MCUs, or any combination thereof. The load current estimate may be determined using a mapping table. A device setting may include an image or video resolution, a framerate, a file type, a power setting, an audio setting, a display setting, or any other configurable device setting. In some implementations, determining 840 the load current estimate may further include determining a current for one or more power sources. The respective currents for the one or more power sources may be based on the load current estimate. The method 800 includes determining 850 a voltage of each available power source. The method 800 includes connecting 860 the one or more power sources to the PMIC based on the determined current for each power source.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:
   a power source;

a switch circuit coupled to the power source and an external power source;

a processor coupled to the switch circuit, the power source, and the external power source, the processor configured to:
- determine a load current estimate based on a device setting and an external temperature;
- determine a power source voltage and an external power source voltage; and
- determine a power source current and an external power source current based on the load current estimate; and a power management integrated circuit (PMIC) coupled to the processor, the PMIC configured to:
- set an output power source current of the power source based on the determined power source current; and
- set an output external power source current of the external power source based on the determined external power source current.

2. The image capture device of claim 1, wherein the switch circuit comprises diodes.

3. The image capture device of claim 1, wherein the switch circuit comprises field effect transistors (FET)s.

4. The image capture device of claim 3, wherein at least one of the FETs is an on-off FET.

5. The image capture device of claim 3, wherein at least one of the FETs is a variable control FET.

6. The image capture device of claim 3, wherein at least one of the FETs is a p-channel FET.

7. The image capture device of claim 3, wherein at least one of the FETs is an m-channel FET.

8. An image capture device comprising:
a first power source;
a second power source;
a switch circuit coupled to the first power source and the second power source;
a processor coupled to the switch circuit, the first power source, and the second power source, the processor configured to:
- obtain first power source data from the first power source and second power source data from the second power source;
- determine a load current estimate based on a device setting and an external temperature;
- determine a first power source voltage and a second power source voltage; and
- determine a first power source current and a second power source current based on the load current estimate; and a power management integrated circuit (PMIC) coupled to the processor, the PMIC configured to:
- set an output power source current of the first power source based on the determined first power source current; and
- set an output power source current of the second power source based on the determined second power source current.

9. The image capture device of claim 8, wherein the first power source comprises a first temperature sensor and the second power source comprises a second temperature sensor.

10. The image capture device of claim 9, wherein the first power source data includes temperature data associated with the first temperature sensor.

11. The image capture device of claim 9, wherein the second power source data includes temperature data associated with the second temperature sensor.

12. The image capture device of claim 8, wherein the second power source is coupled to a microcontroller unit (MCU), and wherein the MCU is configured to obtain the second power source data from the second power source.

13. The image capture device of claim 8, wherein the second power source is coupled to the PMIC via an interface.

14. The image capture device of claim 13, wherein the interface is a universal serial bus (USB) interface or an inductive coupling interface.

15. A method comprising:
obtaining first power source data from a first power source and second power source data from a second power source, wherein the first power source data or the second power source data includes an external temperature;

determining a load current estimate based on the first power source data and the second power source data;

determining a first power source voltage based on the first power source data and a second power source voltage based on the second power source data;

determining a first power source current and a second power source current based on the load current estimate; and on a condition that the external temperature is less than 0° C., connecting the first power source and the second power source to a power management integrated circuit (PMIC) based on the first power source current and the second power source current.

16. The method of claim 15, further comprising:
on a condition that the external temperature is greater than 0° C. and the first power source voltage is greater than the second power source voltage, connecting the first power source to the PMIC.

17. The method of claim 15, further comprising:
on a condition that the external temperature is greater than 0° C. and the second power source voltage is greater than the first power source voltage, connecting the second power source to the PMIC.

18. The method of claim 15, further comprising:
dynamically adjusting the load current estimate to increase a device run time.

19. The method of claim 15, further comprising:
setting an output power source current of the first power source based on the determined first power source current.

20. The method of claim 19, further comprising:
setting an output power source current of the second power source based on the determined second power source current.

* * * * *